Jan. 19, 1960 K. H. WALKOE 2,922,018
DOMESTIC COOKING APPLIANCE
Filed June 23, 1958 2 Sheets-Sheet 1
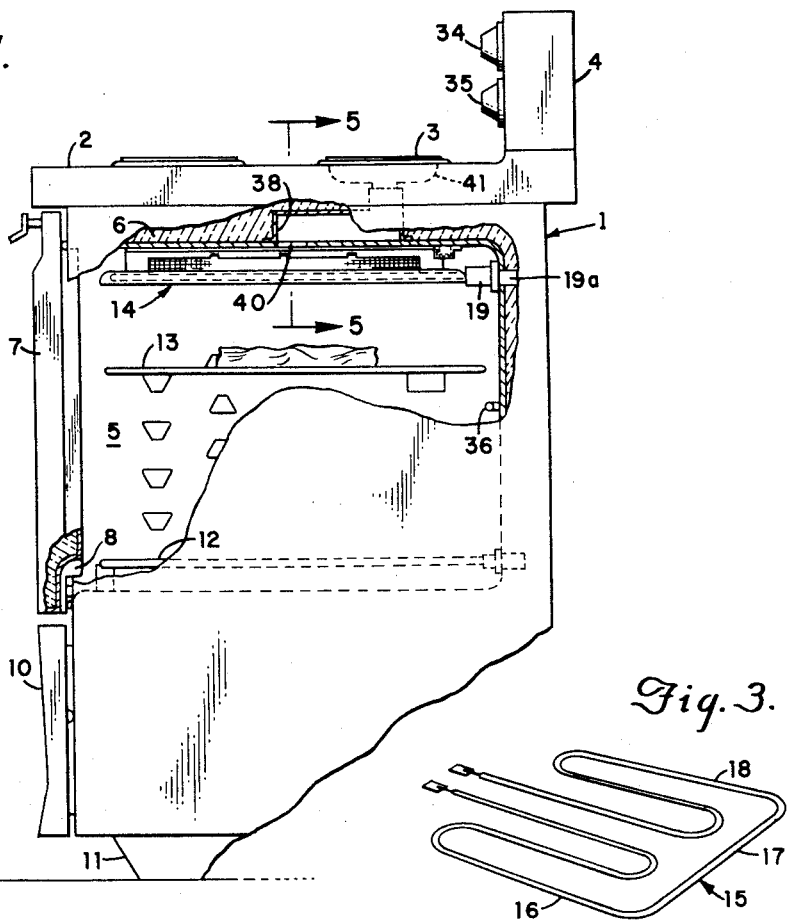
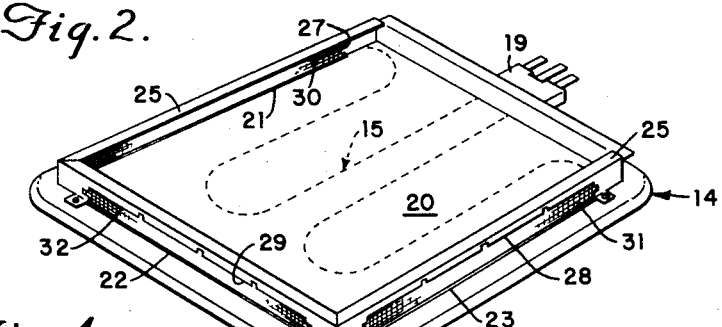
INVENTOR.
KENNETH H. WALKOE
BY
ATTORNEY Jan. 19, 1960  K. H. WALKOE  2,922,018
DOMESTIC COOKING APPLIANCE
Filed June 23, 1958  2 Sheets-Sheet 2

INVENTOR.
KENNETH H. WALKOE
BY
Andrew G. Hubbard
ATTORNEY

United States Patent Office 2,922,018
Patented Jan. 19, 1960

2,922,018

DOMESTIC COOKING APPLIANCE

Kenneth H. Walkoe, Lombard, Ill., assignor to General Electric Company, a corporation of New York Application June 23, 1958, Serial No. 743,903

11 Claims. (Cl. 219—35)

This invention relates to domestic cooking applicances, and more particularly, to cooking appliances having ovens in which foods may be broiled or roasted.

The cooking of foods in an oven by either broiling or roasting is often accompanied by the generation of smoke which passes into the kitchen through the oven vent and also, during broiling, through the front opening of the oven. In most cases, the smoke produced during these cooking operations is a mixture of vaporized greases and water vapor, the greases being present whenever animal or vegetable fat is present in the material being cooked and the temperature of the material is raised above the smoking point of such fats. The smoke thus generated and carried outside the oven is undesirable, for it forms stains on surfaces with which it comes into contact and its odor is frequently objectionable. This undesirable smoke may be oxidized and thus effectively eliminated by directing it into contact with a suitable oxidation catalyst of the type which will start and maintain oxidation at a relatively low temperature. Apparatus previously proposed for accomplishing this consists of a suitably supported electrical resistance wire coil covered with an oxidation catalyst coating. The coil terminals are connected by an appropriate circuit to the electrical energy source for the range. The catalyst coating is heated to its activation temperature by passing an electrical current through the coil. Oxidation catalyst coil apparatus of this type is more fully disclosed in United States Patent 2,731,541, issued to Eugene J. Houdry and Wilfred M. Adey on January 17, 1956. However, it can be seen that an oven equipped with such apparatus requires additional electrical energy and special circuitry in order to effect smoke elimination during the cooking operation.

Accordingly, a principal object of this invention is to provide means to oxidize, and thereby eliminate, range oven smoke, comprising an oxidation catalyst coated screen structure arranged to be heated to its activation temperature without the need for an additional electrical energy circuit.

A more particular object of the present invention is to provide a catalyst coated screen structure assembly in which the screen coating is heated to its activation temperature solely by heat transferred from the oven heating unit to the screen.

A general object of this invention is to provide improved oven smoke elimination means whereby oven cooking operations such as broiling and roasting can be conducted with the oven door in its closed position.

Another object of the present invention is to provide means to eliminate smoke by causing it to pass through a catalyst coated screen structure which is an element of an oven heating unit, whereby the screen structure is heated concurrently with cooking operations in the oven without the use of specialized electrical circuitry and controls.

A further object of the present invention is to provide an improved oven unit assembly comprising an electrical heating unit of the sheathed resistance type and an oxidation catalyst coated screen structure adapted and arranged to oxidize smoke flowing into an oven vent, elements of the screen structure extending into contact with the heating unit so that its coating may be efficiently heated to activation temperature on the energization of said heating unit.

Still another object of the present invention is to provide a simple, inexpensive device incorporating a catalyst coated screen structure which quickly and effectively eliminates smoke generated during oven cooking operations.

Briefly stated, in accord with the illustrated embodiments of my invention, I provide a novel smoke elimination device comprising a heating unit such as a broil unit in a cooking oven, in combination with box-like oven vent screen structure incorporating oxidation catalyst coated screen wall portions whereby the device is effective to heat an oven for cooking operations therein and to eliminate smoke and fumes generated by said cooking operations. The catalyst coating on the screens is of the type which is effective to facilitate the oxidation of organic gaseous matter at a relatively low temperature. Elements of the screens extend into good heat exchange contact with heated external wall portions of the heating unit. The device is so arranged that when it is installed in an oven, the screen structure will substantially cover the oven vent. As a consequence, gaseous matter within the oven must flow through the screen structure in order to reach the vent.

During cooking operations in the oven such as broiling or roasting, the heating unit will be energized and its external wall will be maintained at a relatively high temperature level. Heat will then be efficiently transferred from said heating unit wall to the elements of the screens in contact therewith by conduction, heating the oxidation catalyst coating to its activation temperature level. Accordingly, organic gaseous matter comprising smoke and fumes generated by the cooking operations will move into intimate relationship with the activated catalyst in passing through the screen structure enroute to the oven vent. As the gaseous organic matter flows into contact with the activated catalyst it will be oxidized and smoke and odors generated by cooking operations will thus be effectively eliminated.

A particular feature of the device lies in the fact that it provides means whereby a smoke elimination catalyst may be automatically heated to its activation temperature concurrently with a cooking operation in an oven without the former necessity of individually heating the catalytic element by a separate electrical energy circuit.

The invention, both as to its organization and method of operation, together with further objects and advantages thereof, will best be understood by reference to the following specification taken in connection with the accompanying drawings, in which:

Fig. 1 is a side elevational view of a domestic electric range embodying the present invention, parts of the range being broken away in order to illustrate certain structural details;

Fig. 2 is a perspective view of one form of oven unit embodying my invention;

Fig. 3 is a perspective view of an electrical heating unit forming a part of the oven unit of Fig. 2;

Fig. 4 is an enlarged fragmentary view in perspective illustrating the relationship between the external wall of the heating unit and elements of the screens of the oven unit of my invention;

Figure 5:
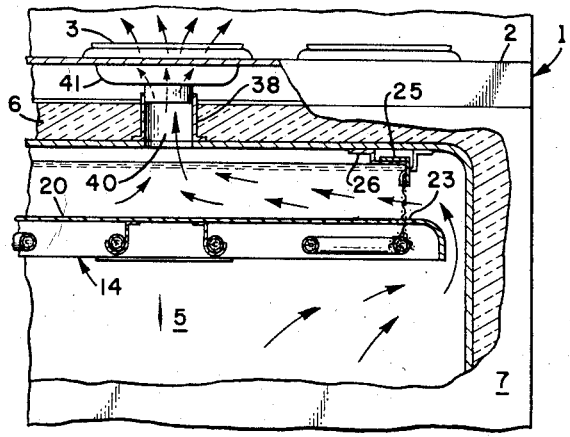
Fig. 5 is a fragmentary sectional view taken along the line 5—5 of Fig. 1.

Referring now to the drawings and particularly to Fig. 1, I have illustrated my invention in application to a domestic electric range. The range comprises a cabinet 1, a cooking top 2, a plurality of surface heating units including a heating unit 3, a backsplash structure 4, and an oven 5. Oven 5 comprises insulated walls including top wall 6 defining a heating compartment having a front opening in which an oven door 7 is mounted. The front door 7 is provided with a recessed portion extending horizontally along the inside of its bottom edge providing an air inlet opening 8 for the oven. The lower portion of the cabinet 1 may include a storage space having a front opening closed by door 10, and a base structure 11 upon which the cabinet 1 is supported. Mounted on the bottom wall of oven 5 is a baking unit 12 adapted to supply heat for baking and roasting purposes.

Mounted adjacent oven top wall 6 in space relation thereto is the oven unit 14 of my invention (see Figs. 1 and 5). The oven unit 14 provides radiant heat for broiling purposes, oven top heat for roasting and baking, and also eliminates smoke generated during oven cooking operations as described more fully hereinafter.

It will be understood that any suitable food support or rack 13 for supporting foodstuffs to be cooked may be provided in oven 5. As shown, the rack is in broiling position, placing the illustrated foodstuff relatively close to the unit 14.

The oven unit 14 shown in Figs. 1, 2 and 5 comprises a shallow box-like structure which is provided with an electrical resistance heating unit coil assembly 15 of the conventional sheathed resistance type. As shown in Fig. 3, the coil assembly is sinuously arranged, with the outer periphery having a generally U shape with a left side portion 16, an end portion 17, and a right side portion 18. The coil assembly has the usual terminal block 19 having terminal blades for electrical connection with the terminals (not shown) of an electrical receptacle 19a fixed to the oven rear wall. The coil assembly 15 is mounted by means of suitable clips in parallel spaced relation to a substantially imperforate reflecting baffle 20 (Fig. 2) which comprises the bottom wall of the unit 14. The baffle 20 is provided with narrow slots 21, 22, 23 (see Fig. 2) located directly above, and extending parallel to the coil assembly side portions and end portion. These slots permit the oxidizing screens, described in detail hereinafter, to extend through the baffle. Mounted to the upper side of the baffle 20 is a quadrilateral sheet metal screen support 24 providing side walls, and end walls for the structure. The screen support 24 is provided on its upper edges with inturned flanges 25 for slidably mounting the oven unit 14 to the top of the oven in a manner substantially blocking passage of oven gases between the flanges 25 and the top of the oven. A convenient mounting means comprises the Z-shaped slides 26, best shown in Fig. 5. The screen support is also provided with relatively large open-bottom apertures 27 and 28 in its side walls, and 29 in at least one end wall, to receive the screens described below. The support 24 may be mounted to the baffle by any suitable means, as for example, by providing it with extended tabs which may be riveted to the baffle 20 as illustrated in Fig. 2. Suitably attached to the screen support so as to cover the apertures 27, 28, and 29 are three rectangular screen panels 30, 31, and 32 embodying an oxidizing catalyst. The screens extend downwardly through the adjacent slot 21, 22, or 23 into direct heat transfer relation with the side and end portions of the heating unit disposed beneath the slots. In Fig. 4, for example, the free end of the respective screen panels is slit, as at 33, to provide a series of tab-like ends which embrace the external wall of the heating unit to be heated thereby when the unit is energized. I thus provide a large heat transfer contact area between the heating unit 15 and the screens. The external wall surface of a typical electric oven heating unit quickly attains a temperature of the order of 1500° F., and because of the large area of contact of the screen panels with the heating unit, the panels also come quickly to operation temperature. As presently explained, the unit 14 is so arranged with respect to the movement of gases through the oven that substantially all of the gases pass through the screens.

To obtain optimum catalyst area while providing mechanical strength, I construct the screens of 0.013 inch diameter chromized steel wire, woven in 30 x 30 mesh. Chromized steel wire compares favorably with conventional high temperature nickel-chromium alloy wire as respects ability to withstand high temperature, and has superior thermal conductivity.

The screen wire is covered or coated with an oxidation catalyst of the type which has the ability to initiate the oxidation of smoke particles at a temperature much lower than that provided by a flame or incandescent source. To be more specific, the catalyst coating will start and maintain the oxidation of organic gaseous matter at temperatures approximating 500° F. A suitable oxidation catalyst of this type is more fully disclosed in U.S. Patent 2,731,541, issued to Eugene J. Houdry and Wilfred M. Adey on January 17, 1956. As a matter of performance, there is no reason to coat the portions of the screen in contact with the heating unit, but it appears more convenient to apply a complete coat than to selectively coat only the active areas of the screens.

The baking unit 12 and the heating element of the oven unit 14 are controlled through a conventional switch having a knob 34 and a conventional thermostat having a knob 35, both knobs being carried on the backsplash structure 4. Within the oven is a thermostat capillary tube 36 comprising the temperature sensitive element of a thermostat 37 (schematically shown in Fig. 6) which is mounted behind the backsplash structure 4.

The oven vent structure comprises an oven vent tube 38 communicating between a vent opening 40 in top wall 6 of the oven, and a discharge opening which, pursuant to standard practice in electric ranges, may be the opening in the cooking top 2 in which surface heating unit 3 is mounted. Thus, the upper end of vent tube 38 may terminate directly under the funnel-shape reflector pan 41, as is more fully disclosed in U.S. Patent 2,525,062, issued to Leo F. Berg on October 10, 1950. However, this particular location of the outlet of the oven venting system is not an essential feature of the present invention, and, if desired, a separate outlet in the cooking top 2, the backsplash structure 4, or the side walls of cabinet 1 may be provided. It will be understood that vent tube 38 may be of any suitable cross sectional shape, and be fabricated in any convenient manner. It is, of course, important that the oven vent opening 40 be disposed within the area bounded by the four walls of the screen support, whereupon the oven gases may reach the opening 40 only by passing through the oxidizing screens.

Figure 6:
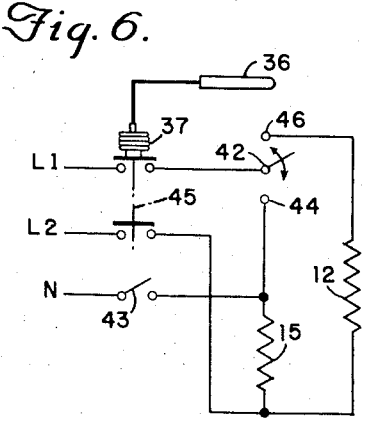
Fig. 6 is an electrical circuit diagram of the oven control network incorporated in the range of Fig. 1.

In the present embodiment of the invention, the oven is operated for broiling and baking by setting switch knob 34 and thermostat knob 35 to the desired setting. The electrical circuit shown in Fig. 6 is conventional, and forms no part of this invention. The electrical potential between L1 and L2 is 236 volts, and between either L1 and L2 and neutral is 118 volts. The switch knob 34 simultaneously operates a conventional single pole, double throw switch 42 and a conventional single pole, single throw switch 43. When switch knob 34 and thermostat knob 35 are turned to a "broil" setting, switch 42 will be actuated to engage contact 44, switch 43 will open, and double pole thermostat switch 45 will close. As is well known, the thermostat setting at the broil position ordinarily represents a temperature of at least 550° F. within the oven. As the oven is initially cold, the contacts of switch 45 will thus be in closed circuit position. We then have a complete broil unit circuit from L1, through thermostat switch 45, through switch 42 and contact 44, through heating unit coil assembly 15, and through switch 45, to L2. As the unit 15 is across terminals L1 and L2, 236 volts is applied to heating unit 15 during the broiling operation, whereupon the external wall of the heating unit attains a temperature approximating 1550° F. The respective screens and the oxidation catalyst coating thereon will be quickly heated to the activation temperature by heat transfer from the heating unit wall. As the broiling operation proceeds and the oven 5 is heated, an oven air circulation will take place. Air enters the oven through opening 8 and its upward flow within the oven will be diverted about the edges of the imperforate baffle 20. Then, in order to reach the oven vent opening 40, the air, bearing the greasy vapors and other unconsumed combustible matter must substantially entirely pass through the screens, as shown by the arrows in Fig. 5. As the smoke and fumes flow through the catalyst coated screens, they are oxidized by contact therewith. This oxidation releases more heat which supplements that from the heating unit in maintaining the screens at the activation temperature. Substantially all of the organic matter in smoke generated during broiling will be oxidized in this manner and thus transformed into carbon dioxide and water vapor. Accordingly, the gases issuing from the vent opening in the top surface of the range will be both colorless and substantially odorless and therefore unobjectionable.

Figure 7:
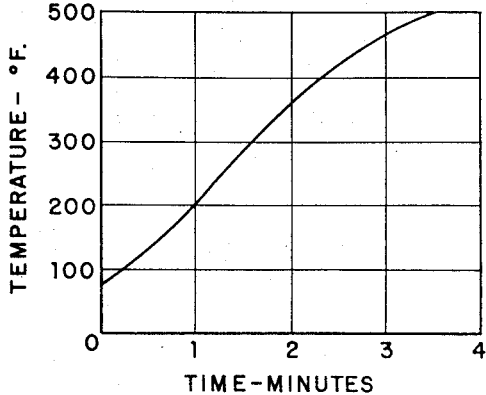
Fig. 7 is a time and temperature chart illustrating the time required for the catalyst coated screen structure of the present invention to reach its effective temperature.

The illustrated embodiment of my invention is effective to heat the catalyst coating on the screens to its activation temperature within a relatively short time after the heating unit is energized. This quick temperature is illustrated by the time and temperature chart, prepared from actual performance test data, shown in Fig. 7. As shown on the chart, the screen structure's catalyst coating reaches 500° F., its effective temperature, within approximately 3½ minutes. Also, tests have shown that it takes a period longer than this for meats and other foods to reach the temperature at which they emit objectionable smoke. Accordingly, my invention is activated for catalytic oxidation even before meats or other foods can produce objectionable smoke or odors.

During roasting or baking operations, the knob 34 is turned to a "bake" setting. This will cause the single pole, double throw switch 42 to close so as to energize "bake" contact 46. Also, single pole, single throw switch 43 will be closed by turning knob 34 to the "bake" setting. As the oven is cool at this time, the double pole thermostat switch 45 will be closed. The bake unit circuit is then L1 through 45, through switch 42, contact 46, through baking unit 12 and thermostat switch 45 to L2. It will be noted that in the preferred oven circuit illustrated in Fig. 6, the heating unit 15 is also energized during roasting or baking, in order to provide top heat for browning, with a circuit from L2 through 45, through unit 15 and switch 43 to N. As the screens 30, 31, and 32 are maintained in contact with the heating unit 15 when it is energized during roasting and baking operations, they will also be heated at this time. Although the voltage across the terminals of unit 15 is less during roasting or baking than during broiling and unit operation is intermittent because of thermostat cycling, sufficient heat is transferred from the unit to the catalyst on the screens to insure that the relatively small amount of smoke generated during roasting and baking operations in the oven is not objectionable.

Performance tests have shown that when the door of an oven incorporating my invention is maintained in a closed condition during cooking in the oven, the smoke generated by the cooking is oxidized by the operation of the invention at approximately the same rate at which the smoke is generated. Thus, a build-up of smoke within the oven is prevented, eliminating the danger of releasing an objectionable cloud of smoke on opening of the door. This is true of even a meat broiling operation in which the meat produces relatively large quantities of smoke and fumes as it is being broiled. Accordingly, my invention provides means whereby the oven door can be maintained in a closed condition during all cooking operations therein, thus eliminating the escape of smoke through the front opening of the oven during a broiling operation.

Figure 8:
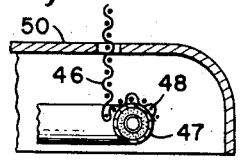
Fig. 8 is an enlarged fragmentary sectional view illustrating a modified arrangement for obtaining heating contact between a catalyst coated screen and the external wall of a heating unit.

Turning now to Fig. 8, I have shown therein a modified arrangement for obtaining contact between a catalyst coated screen 46 and a heating unit 47 of the sheathed resistance type. Here, the lower edge of the screen is bent angularly outward and upward, and then bent downward at right angles to the first bend, providing a generally V shaped edge 48 adapted to engage upper portions of the heating unit sheath. The screen 46 may then be suitably mounted to a baffle 50 with the screen engaging the sheath along the groove formed by edge 48. It will be understood that the edge 48 is forced upward about its attached edge to seat against the external wall of the heating unit. The resilience of the screen wire will then cause edge 48 to press downward on the heating unit. This arrangement provides positive contact and a relatively large contact area, facilitating heat transfer by conduction.

Figure 8A:
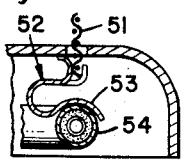
Fig. 8a is similar to Fig. 8 but shows another modification for obtaining heating contact.

In Fig. 8a, I have shown another modification for obtaining contact between a catalyst coated screen and a sheathed heating unit mounted to a baffle structure. As shown, the lower edge of a baffle-mounted screen 51 is provided with a longitudinally extending resilient steel strip 52. The strip is generally of a U shape in cross-section, with one edge being suitably attached to the screen. The free edge 53 has a curved conformation adapted to provide a relatively large contact area with the exterior wall of an electrical heating unit 54. The strip 52 is slightly compressed when the heating unit 54 is assembled in contact therewith. Accordingly, the resilience of the strip 52 will ensure good contact between the heating unit 54 and the strip 52 and thus facilitate an efficient heat transfer between the heating unit and the catalyst coated screen 51.

Figure 9:
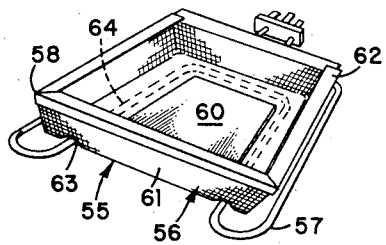
Fig. 9 is similar to Fig. 2 but shows a modified form of my invention.

In Fig. 9, I have shown a somewhat modified form of my oven unit invention. As indicated, an oven unit 55 includes a screen structure 56 and a heating unit 57. The screen structure 56 is adapted to substantially cover an open vent and consists of a generally shallow box-like structure including an upper angular frame 58, an imperforate sheet metal bottom portion 60 and a collar-like screen portion 61 suitably attached between the bottom portion and the upper angular frame. Screen portion 61 consists of oxidation catalyst coated screening identical to that used to fabricate screens 30, 31, and 32. The frame has inturned flanges 62 to mount the unit 55 over a vent in the upper part of an oven similar to the arrangement illustrated in Figs. 1 and 5. The screen extends downward at an angle from its frame to a point below the top of the heating unit sheath, and then curves upward to form a longitudinal, downwardly open, U shaped groove 63 which is adapted by its shape and dimensions to snugly engage an inner U shaped portion 64 of the heating unit 57. As illustrated, this arrangement provides a relatively large contact area between the screen material and the heating unit sheath. The operation of the modification shown in Fig. 9 is very similar to that of the embodiment shown as Fig. 1 and described in detail hereinbefore.

Briefly, the oven unit 55 provides radiant heat for broiling purposes, oven top heat for roasting and baking, and eliminates smoke generated during cooking operations by oxidizing it in the presence of the catalyst carried on the screen structure 56 covering the vent opening. However, the embodiment shown in Fig. 9 dispenses with a radiant heat reflecting baffle such as baffle 20, and the screen structure 60 is heated by an inner portion of the heating unit coil assembly rather than its outer peripheral portion as in the embodiment shown in Figs. 1, 2 and 5.

Figure 10:
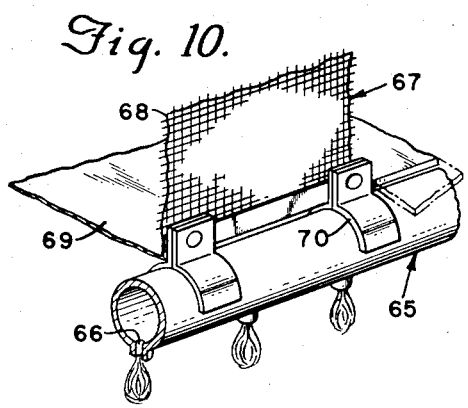
Fig. 10 shows a somewhat schematic illustration of a modification of my invention in application to a heating unit for heating a cooking oven by gas.

Referring now to Fig. 10, I have shown therein my invention in application to a conventional gas oven heating unit 65, of generally cylindrical cross-section, only a fragment of which is shown, which may be mounted in spaced relation to the top wall of an oven. The lower portion of the wall of heating unit 65 is provided with a plurality of spaced, nipple-like protuberances provided with gas openings 66 for emitting the gas that is burned in heating the oven. It will be understood that heating unit 65 may be provided with a suitable control valve (not shown) and may be suitably connected to a conventional fuel gas source (not shown). A box-like screen structure 67, only part of which is shown, is disposed immediately above the heating unit, with a side wall portion in contact therewith. The structure 67 includes oxidation catalyst coated wire screen panels 68, only a fragment of one being shown, providing side walls for the screen structure. The structure 67 is also provided with an imperforate sheet metal bottom wall (only partially shown) which extends in covering relation with the top of the heating unit 65. A portion of the top wall of an oven including heating unit 65 may contain an oven vent (not shown) which is substantially covered by screen structure 67. Accordingly, gaseous matter in the oven must flow through the screen panels 68 in order to escape from the oven through the oven vent. In order to facilitate the transfer of heat from heating unit 65 to the screen panels 68, I provide the lower edge of the screen structure with a series of pairs of resilient metal tabs 70 which are arranged to contact heating unit 65. The pairs of tabs 70 are suitably attached to the screen structure in spaced apart relation around its lower edge, with the tabs of each pair on opposite sides of the heating unit wall in a straddling arrangement. As illustrated, the tabs have a curved conformation adapted to closely engage the external wall of heating unit 65. On the assembly of the screen structure over the heating unit, the resilient tabs which extend below the top of the heating unit, yield under slight pressure to facilitate the proper positioning of the structure over the heating unit. However, when the pressure is released, the tabs will snap into intimate contact with the wall of the heating unit, ensuring an efficient transfer of heat between the heating unit 65 and the screen panels 68. During a cooking operation, as for example, a meat broiling operation, a flaming gas jet will extend from each of the openings 66 in unit 65. The jets will supply heat to broil the meat, and in addition, will heat the screen panels 68 and the coating thereon to the catalyst activation temperature, aided by heat transfer through the tabs 70. Accordingly, smoke generated by the meat broiling operation will be eliminated by oxidation in passing through the activated screens 70 enroute to the oven vent.

While there has been described what is at present considered to be the preferred embodiments of the invention, it will be understood that various modifications may be made therein, and it is intended to cover in the appended claims all such modifications as fall within the scope of the invention.

I claim:

1. In a cooking range, an oven having a vent opening in the top wall thereof and an air inlet passage in a lower portion of said oven to provide an air movement therethrough during a cooking operation, an oven unit for broiling, browning, and smoke elimination in the upper portion of said oven, said oven unit comprising a shallow, rectangular, box-like structure having a bottom wall, side walls, and end walls, said bottom wall having a narrow slot adjacent to and paralleling its outer edge on three of its sides but being otherwise imperforate, a heating unit of the sheathed resistance type secured to the lower surface of said bottom wall, said heating unit being arranged to have rectilinear portions respectively disposed in registering relationship with said slots, the side walls and an end wall of said box-like structure having relatively large apertures therein, wire fabric screens of relatively fine mesh fixed to said walls in covering relation with each of said apertures, the wires of said screens having a coating of a catalyst of the type which on being heated to its activation temperature becomes effective to facilitate the oxidation of air-borne organic smoke particles coming into contact therewith upon passage through said screens, lower edge portions of said screens extending through said slots into heat transfer relationship with the sheath portion of said heating unit over a substantial area thereof, means for connecting said heating unit to an electric energy source, control means for energizing said heating unit during cooking operations in said oven, whereby said catalyst will be heated to its activation temperature by heat transferred to the said screens from the external wall of said heating unit during its energization, and means for mounting said box-like structure in enclosing relation to said oven vent opening, whereby smoke particles generated during a cooking operation will be transported through said screens by air movement to said oven vent and will be oxidized upon contact with said catalytic coating.

2. Domestic cooking apparatus comprising, in combination, a cooking oven having in a wall thereof outlet means for the discharge of vapors emanating from foodstuffs being cooked therein; heating means within said oven, comprising a heating unit adjacent the said outlet-provided wall, said heating unit having a continuous outer wall of heat conducting material and being further characterized by run portions substantially parallel to said oven wall in laterally disposed relation to said outlet means; means for raising the outer wall temperature of said heating unit to substantially above 500° F.; and smoke elimination means disposed between said heating unit and said oven wall, said last-named means comprising structure having at least one wall portion of relatively fine-mesh, heat-resistant fabric substantially coextensive with at least one of the heating unit run portions and interposed in the path of movement of said vapors toward said outlet means, said fabric wall portion having catalytic properties effective at an activation temperature lower than the said wall temperature of the energized heating unit to facilitate the oxidation of combustible matter coming in contact therewith, said fabric wall portion having a multiplicity of tab-like heat conduction portions of substantial surface contact area embracing said heating unit wall in positive heat-transfer engagement therewith, whereby said fabric wall portion will be heated to its catalytic activation temperature by direct heat transfer from said heating unit wall, and means for mounting said smoke elimination means to cause substantially all of said vapors to pass through said heated fabric and thereby effect the oxidation of combustible constituents of said vapors.

3. Domestic cooking apparatus according to claim 2 in which the screen structure includes a radiant energy-reflecting baffle disposed intermediate said heating unit and said fabric wall portion and in covering relation to said air outlet opening.

4. Apparatus according to claim 2 in which the tab-like portions are integral with said fabric wall portion.

5. In combination, wall means defining a cooking chamber, vent means in one wall thereof to accommodate the passage of gaseous matter emanating from foods being cooked in said chamber, a heating element within said chamber for cooking foods placed therein, said heating element having an external wall of thermally conductive material, means for mounting said heating element in close spaced relation to said one wall with a substantial portion of said heating element surrounding said vent means, smoke abatement means comprising foraminated wall portions of thermally conductive material, said wall portions having applied thereto a catalyst of the type which upon reaching a predetermined activation temperature initiates the combustion of organic matter coming into contact therewith, said wall portions having heat conducting elements of substantial area maintained resiliently in heat transfer relation with the exterior wall surface of said heating element, means for mounting said smoke abatement means with the foraminated wall portions thereof in enclosing relation to said vent means, baffle means extending across the portions of said foraminated wall portions in covering relation to said vent means and intermediate said heating element and said vent means to cause gaseous matter to pass through said foraminated wall portions to reach said vent means, and means for operating said heating element at a temperature at which the external wall thereof will be substantially above the activation temperature of said catalyst, whereby said catalyst becomes activated by heat transfer from said heating element and organic particles in the gaseous matter emanating from foodstuff being cooked within said chamber will be consumed upon contact with said catalyst and the quantity of smoke-producing material in said gaseous matter will be reduced prior to the passage thereof into said vent means.

6. The combination according to claim 5, in which the heating element is of the tubular sheathed electric resistance type.

7. The combination according to claim 5, in which the heating element is of the gas-fuel type.

8. Domestic cooking apparatus comprising, a cooking oven, access means for said cooking oven, air inlet means in a wall of said oven, air outlet means in a wall of said oven, said air inlet and said air outlet means providing for air circulation through said oven during cooking operations therein, heating means within said oven for broiling operations therein comprising an electrical heating unit of the sheathed resistance type, means to mount said heating means within said oven in an upper portion thereof, energizing means for said heating means, and smoke elimination means comprising a box-like screen structure substantially enclosing said outlet means and disposed between said heating unit and said outlet means, said screen structure having at least one wall portion with a relatively large opening therein covered by a relatively fine mesh wire fabric screen permitting a circulation of gaseous matter therethrough, said screen having a catalyst coating of the type which on reaching a predetermined activation temperature becomes effective to initiate the oxidation of organic gaseous matter coming into contact therewith, a lower edge of said screen extending into contact with an external wall portion of said heating unit, said edge having a conformation adapted to provide a positive, intimate contact with the external wall of said heating unit, whereby said catalyst coating will be heated to its activation temperature by heat transferred from said heating unit during its energization, and organic gaseous matter generated by cooking operations in said oven will be conveyed through said screen by air flowing from said inlet means to said outlet means and be oxidized upon contact with said activated catalyst.

9. Domestic cooking apparatus according to claim 8 in which the lower edge of said screen comprises a series of angularly projecting portions defined by slits extending from said lower edge, portions embracing the external wall of said heating unit in contact therewith.

10. Domestic cooking apparatus according to claim 8 in which the lower edge of said screen comprises a downwardly facing, V shaped, longitudinal portion adapted to receive the upper portion of the external wall of said heating unit in heat transfer relation therewith.

11. Domestic cooking apparatus according to claim 8 in which the lower edge of said screen comprises a longitudinally extending resilient metal member having a concave portion adapted snugly to receive the external wall of said heating unit in heat transfer relation therewith.

References Cited in the file of this patent

UNITED STATES PATENTS

| | | |
|---|---|---|
| 2,177,258 | Jares | Oct. 24, 1939 |
| 2,211,812 | Colbert | Aug. 20, 1940 |
| 2,729,735 | Fries | Jan. 3, 1956 |
| 2,731,541 | Houdry et al. | Jan. 17, 1956 |
| 2,752,475 | Norris | June 26, 1956 |
| 2,846,557 | Schulze et al. | Aug. 5, 1958 |

FOREIGN PATENTS

| | | |
|---|---|---|
| 667,746 | Great Britain | Mar. 5, 1952 |